United States Patent
Wang

(10) Patent No.: US 6,202,714 B1
(45) Date of Patent: Mar. 20, 2001

(54) AIR PUMP HAVING SPACE FOR CONTAINING AIR BOTTLE

(76) Inventor: Lopin Wang, 16F-2, No. 17, Lane 52, Sec. 3, Je-He Road, Taichung (TW)

( * ) Notice: Subject to any disclaimer, the term of this patent is extended or adjusted under 35 U.S.C. 154(b) by 0 days.

(21) Appl. No.: 09/501,291

(22) Filed: Feb. 9, 2000

(51) Int. Cl.$^7$ ....................................................... B65B 1/04
(52) U.S. Cl. .............................. 141/329; 141/38; 141/67; 141/301; 222/386
(58) Field of Search .................................. 141/38, 37, 67, 141/98, 285, 301, 302, 329, 330, 19; 222/386, 387

(56) References Cited

U.S. PATENT DOCUMENTS

| | | | |
|---|---|---|---|
| 4,969,493 | * | 11/1990 | Lee .......................................... 141/38 |
| 5,967,204 | * | 10/1999 | Ferris et al. .......................... 141/383 |

* cited by examiner

*Primary Examiner*—Steven O. Douglas
(74) *Attorney, Agent, or Firm*—Browdy and Neimark

(57) ABSTRACT

An air pump comprises a head member, an inner tube, a check valve, and one-way air valve. The head member is provided therein with a control valve which is provided at one end thereof with an air nozzle and at other end thereof with a press rod for controlling the control valve. The head member is provided in one side thereof with a connection portion which is in turn provided with a channel and a guide cell. The inner tube is connected with the connection portion and is provided therein with a receiving space in communication with the channel and the guide cell. The receiving space is in communication with the atmospheric air via an air duct in which the check valve is disposed. The inner tube is fitted into an outer tube such that a compressible space is formed therebetween, and that the outer tube moves in relation to the inner tube. The one-way air valve is disposed between the inner tube and the outer tube to enable air to enter the compressible space, thereby enabling the outer tube to compress the air contained in the compressible space. The compressed air is let out to inflate an inflatable object via the check valve, the control valve, and the air nozzle.

9 Claims, 4 Drawing Sheets

US 6,202,714 B1

AIR PUMP HAVING SPACE FOR CONTAINING AIR BOTTLE

FIELD OF THE INVENTION

The present invention relates generally to an air pump, and more particularly to an air pump provided with a space for containing an air bottle.

BACKGROUND OF THE INVENTION

The conventional air pump is generally defective in design in that the air in the high pressure air bottle is not effectively pumped into the object being inflated. In addition, when the air bottle is exhausted of the high pressure air, no additional air bottle is immediately available.

SUMMARY OF THE INVENTION

The present invention is intended to overcome the shortcomings of the conventional air pump described above.

The air pump of the present invention comprises a head member, an inner tube, a check valve, and a one-way air valve. The head member is provided therein with a control valve which is provided at one end thereof with an air nozzle and at other end thereof with a press rod for controlling the control valve. The head member is provided in one side thereof with a connection portion which is in turn provided with a channel and a guide cell. The inner tube is connected with the connection portion and is provided therein with a receiving space in communication with the channel and the guide cell. The receiving space is also in communication with the atmospheric air via a duct in which the check valve is disposed. The inner tube is fitted into an outer tube such that a compressible space is formed between the inner tube and the outer tube, and that the outer tube is movable in relation to the inner tube. The one-way air valve is disposed between the inner tube and the outer tube to enable air to enter the compressible space, thereby enabling the outer tube to compress the air contained in the compressible space. The compressed air is let out to inflate an object via the check valve, the control valve, and the air nozzle.

DETAILED DESCRIPTION OF THE INVENTION

Figure 1:
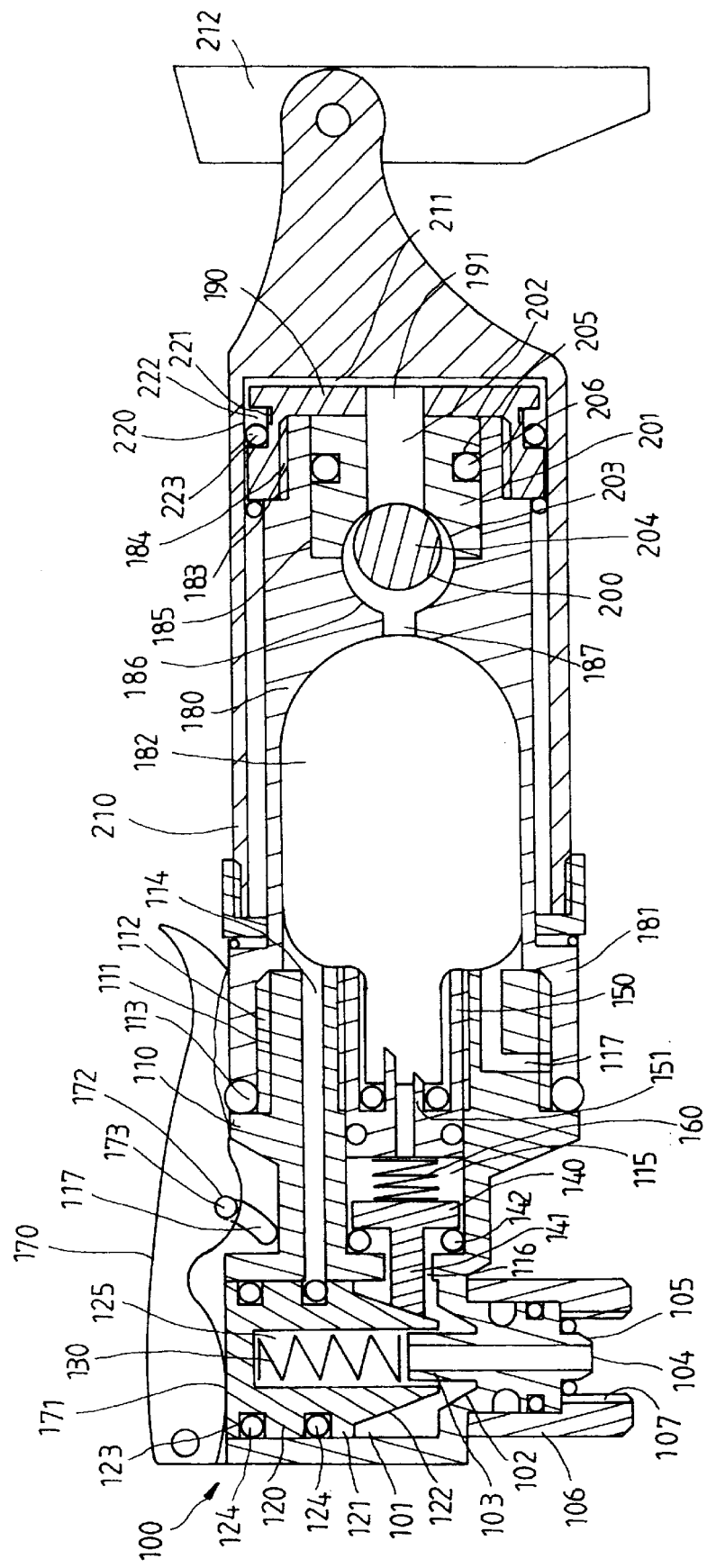
FIG. 1 shows a sectional view of the present invention.

As shown in FIG. 1, an air pump of the present invention comprises the component parts which are described explicitly hereinafter.

A head member 100 is provided with a receiving cell 101 which is in communication with the atmospheric air at one end thereof and is provided at other end thereof with a V-shaped inclined slot 102 which is in turn provided with a guide tube 103 facing the one end of the cell 101, and an air duct 104 via which the cell is in communication with the atmospheric air. The air duct is provided with an air nozzle 105 which is provided at the outer side thereof with a connection tube 106 fastened pivotally therewith. The connection tube 106 is provided in other end thereof with a threaded section 107 for engaging an inflatable object. The head member 100 is provided in one side thereof with a connection portion 110 which is provided in the protruded end thereof with a shoulder 111 smaller in outer diameter and having a threaded section 112 and a leakproof ring 113. The connection portion 110 is provided therein with a channel 114 and a guide cell 115. The channel 114 runs through the connection portion 110 to communicate with the receiving cell 101. The guide cell 115 is in communication with the receiving cell 101 via an air hole 116. The connection portion 110 is provided in one side thereof with an arcuate hole 117.

A movable block 120 has a cylindrical body 121 and an inclined end 122 of a conical shape. The inclined end 122 is received in the receiving cell. The cylindrical body 121 is provided with two annular slots 123 which are in turn provided therein with a leakproof ring 124. The movable block 120 seals off the receiving cell 101. The inclined end 122 is provided at the center thereof with a guide hole 125 facing the cylindrical body 121 such that the guide tube 103 of the receiving cell 101 is received in the guide hole.

A spring 130 is disposed in the guide hole 125 of the movable block 120 such that the spring 130 urges the movable block 120 and the guide tube 103.

A control valve 140 is a disk which is disposed in the guide cell 115 of the head member and is provided at the center thereof with a pillar 141 which is received in the air hole 116 of the guide cell such that the pillar 141 presses against the inclined plane of the inclined end 122 of the movable block. The pillar is provided with a leakproof ring 142.

A flow guiding member 150 of a tubular construction is provided with a needle-shaped end 151 which faces the direction away from the receiving cell 101 of the head member such that the flow guiding member 150 is disposed in the guide cell 115 of the connection portion. The needle-shaped end is fitted over by a leakproof ring 152.

A spring 160 is disposed in the guide cell 115 of the head member connection portion such that the spring 160 is located between the control valve 140 and the flow guiding member 150 for forcing the disk face of the control valve to press against the leakproof ring 142 of the pillar.

A press rod 170 is pivoted at one end thereof with the outer end of the opening of the receiving cell 101 of the head member. The press rod 70 is provided with a protrusion 171 corresponding in location to the opening of the receiving cell for urging the movable block 120 to move toward the guide tube 103 of the receiving cell. The press rod 70 is provided in the midsegment thereof with a through hole 172 corresponding in location to the arcuate hole 117 of the connection portion of the head member. A bolt 173 is received in the arcuate hole 117 and the through hole 172 to enable the press rod to move along the arcuate hole.

An inner tube 180 is provided at one end thereof with an annular threaded portion 181 which is engaged with the threaded section 112. The inner tube is provided therein with a receiving space 182 in communication with the channel 114 and the guide cell 115 for receiving a high pressure air bottle. The inner tube is provided at other end thereof with a shoulder surface 183 smaller in inner diameter and having a threaded section 184, and a receiving recess 185 facing the receiving space 182. The receiving recess is provided in the bottom thereof with a semispherical cavity 186 which is in communication with the receiving space 182 via a passage 187. The shoulder surface 183 of the inner tube is fitted into a rear cover 190 which is provided in the middle thereof with an air inlet 191.

A check valve 200 is disposed in the receiving recess 185 and is formed of an end fitting member 201 which is received in the receiving recess and in communication with the air inlet 191 of the rear cover 190 via a channel 202, and is provided with a semispherical cavity 203 contiguous to the semispherical cavity 186. A stop member 204 is disposed between these two semispherical cavities. The stop member of the preferred embodiment is a round ball. The end fitting member 201 is provided in the outer periphery thereof with an annular slot 205 for disposing a leakproof ring 206 to seal off the end fitting member and the wall of the receiving recess 185.

An outer tube 210 is fitted at one end thereof over the inner tube 180 such that the bottom of the inner wall of the outer tube 210 and the rear cover 190 form therebetween a compressible space 211. The outer tube 210 is provided at other end thereof with a handle 212.

A one-way air valve 220 is disposed on the outer periphery of the rear cover 190 and is formed of an annular slot 221 which is provided in the side wall thereof with a plurality of toothed grooves 222, and a leakproof ring 223 for sealing off the annular slot to allow air to enter from the atmosphere into the compressible space 211 in a one-way manner.

As shown in FIG. 1, in the process of assembling the present invention, the air bottle is first disposed in the receiving space 182 before the connection portion 110 of the head member is engaged with the threaded portion 181 of the inner tube such that the air bottle is forced upon so as to enable the needle-shaped end 151 of the flow guiding member 150 to be inserted into the air outlet of the air bottle, thereby guiding the high pressure air into the guide cell 115 to attain the inflation preparation. In the meantime, the air outlet of the air bottle is sealed off by the leakproof ring 152. The control valve 140 is forced by the spring force of the spring 160 to urge the leakproof ring 142 to result in the interruption of communication between the guide cell 115 and the receiving cell 101.

Figure 2:
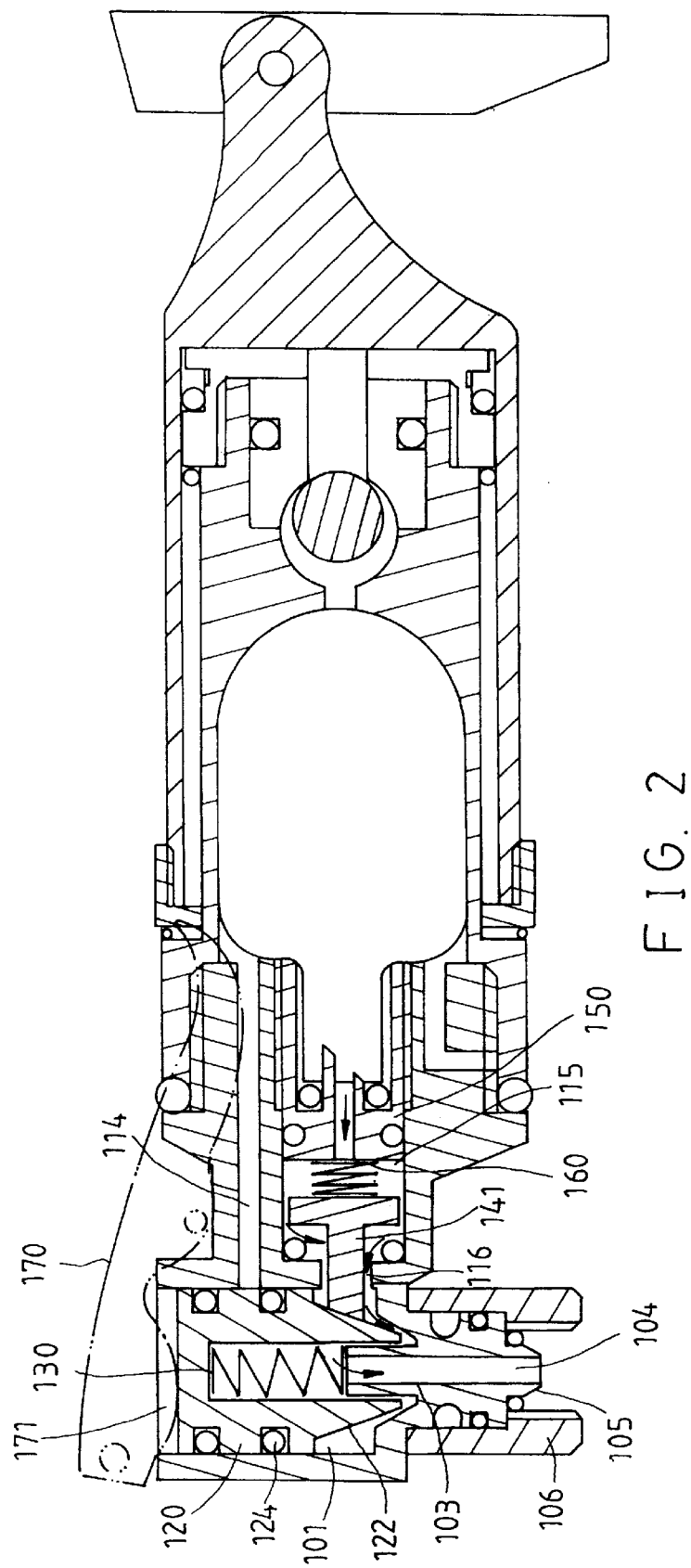
FIG. 2 shows a schematic view of the present invention at work.

As shown in FIG. 2, in the process of inflating an object by using the air bottle, the inflation valve of the object is first connected with the air nozzle 105 before the press rod 170 is pressed downward such that the protrusion 171 of the press rod forces the movable block 120 to displace downward so as to cause the leakproof ring 124 to shut off the communication between the channel 114 and the guide tube 103. In the meantime, the inclined end 122 of the movable block pushes the pillar 141 of the control valve to move in the direction toward the flow guiding member 150 and compresses the spring 160, thereby causing the guide cell 115 to be in communication with the receiving cell 101. As a result, the high pressure air contained in the air bottle is guided to the air nozzle 105 via the flow guiding member 150, the guide cell 115, the air hole 116, the receiving cell 101, the air duct 104 of the guide tube 103, as indicated by the arrows in FIG. 2. As the press rod 170 is let go, the movable block 120 is forced by the recovery force of the spring 130 to return to its original position as shown in FIG. 1. In view of the spring force of the spring 160, the control valve 140 obstructs once again the communication between the guide cell 115 and the receiving cell 101.

Figure 3:
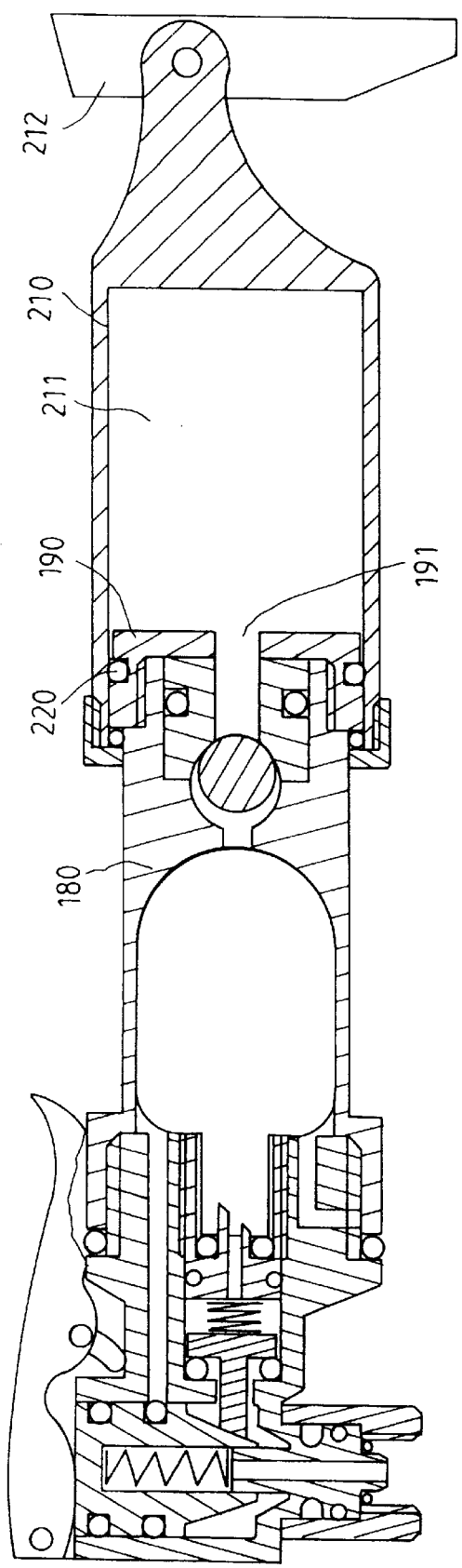
FIGS. 3 and 4 are schematic views of the manual operation of the present invention.
Figure 4:
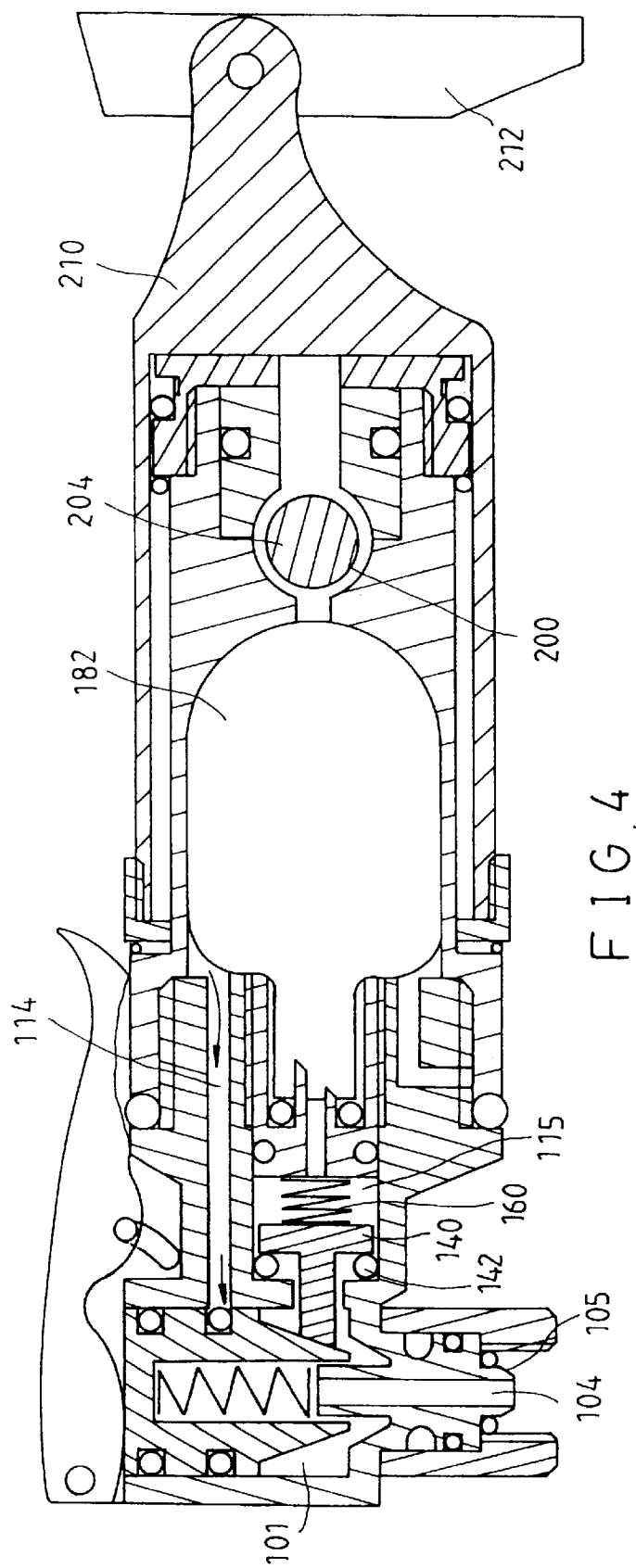

In the event that the inflation of the object can not be completely attained by the air bottle, the inflation can be manually operated, as shown in FIGS. 3 and 4. The handle 212 is first pulled outward to cause the outer tube 210 to move outward, thereby resulting in the enlargement of the compressible space 211 in which air pressure becomes smaller so as to draw in the atmospheric air in the direction indicated by the arrow. The atmospheric air is thus drawn into the compressible space 211 via the gap between the inner tube 180 and the outer tube 210, and the one-way air valve 220 of the rear cover 190. The handle 212 is then pushed back, as shown in FIG. 4. In view of air being prevented from flowing in reverse by the one-way air valve 220, the air in the compressible space 211 is forced by the outer tube 210 to flow through the air inlet 191, thereby pushing away the check valve 200 to enter the receiving space 182, from which the air is eventually guided to the air nozzle 105 via the channel 114, the receiving cell, the guide hole 125, and the air duct 104. The process described above is carried out repeatedly, if necessary.

Figure 5:
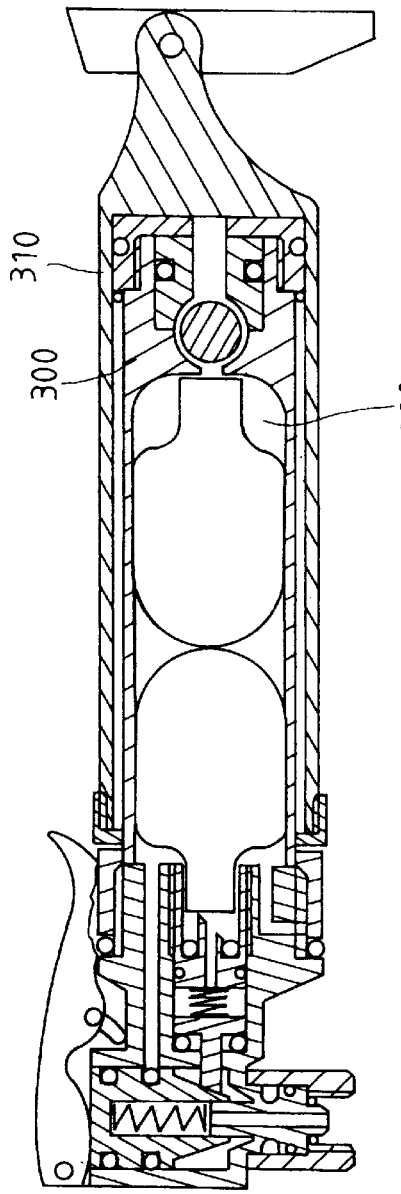
FIG. 5 shows a sectional view of a second preferred embodiment of the present invention.

As shown in FIG. 5, an air pump of another preferred embodiment of the present invention comprises an inner tube 300 and an outer tube 310, which have a greater length to enable the receiving space 320 of the inner tube to become longer to accommodate two air bottles. In the meantime, the manual operation of the air pump is still workable. In light of an increase in the displacement of the outer tube 310 in relation to the inner tube 300, the volume of air that is compressed in one stroke increases substantially.

As shown in FIG. 1, the connection portion of the head member of the present invention is provided with a release passage 117 in communication with the receiving space 182 of the inner tube 180. The residual high pressure air in the receiving space is thus released from the release passage 117 at such time when the connection portion of the head member and the inner tube become unfastened. As a result, the head member and the inner tube are prevented from being disengaged and ejected to inflict injury on the user of the air pump or the bystander.

What is claimed is:

1. An air pump comprising:
   a head member provided with a receiving cell having in one end an opening in communication with atmospheric air, said receiving cell provided in other end thereof with an air duct for communicating said receiving cell with the atmospheric air, said air duct provided at one end thereof with an air nozzle, said head member provided in one side thereof with a connection portion which is in turn provided with a channel and a guide cell;
   a movable block disposed in said receiving cell and provided with at least one leakproof ring fitted thereover for sealing off inner wall of said receiving cell;
   a spring disposed in said receiving cell such that said spring urges said movable block and said air duct;
   a flow guiding member of a tubular construction and having a needle-shaped end, said flow guiding member being disposed in said guide cell of said connection portion such that said needle-shaped end faces a direction opposite to said receiving cell of said head member;
   a control valve disposed in said guide cell such that said control valve is contiguous to one end of said receiving cell;
   a spring disposed between said control valve and said flow guiding member for forcing said control valve to shut off communication between said guide cell and said receiving cell;
   a press rod fastened pivotally with an outer end of said head member for pushing said movable block to move so as to control the opening and the closing of said control valve;

an inner tube connected at one end thereof with said connection portion and provided therein with a receiving space to accommodate an air bottle, said receiving space being in communication with said channel and said guide cell, said receiving space having one end in communication with atmospheric air via a passage;

a check valve disposed in said passage for allowing one-way flow of air into said receiving space;

an outer tube fitted over said inner tube to form therebetween a compressible space; and a one-way air valve disposed between said inner tube and said outer tube for allowing one-way flow of atmospheric air into said compressible space such that said outer tube moves in relation to said inner tube so as to compress air contained in said compressible space, thereby enabling the compressed air to be released from said air nozzle via said check valve.

2. The air pump as defined in claim 1, wherein said receiving cell of said head member is provided with an inclined slot contiguous to said air duct; wherein said movable block has a body and an inclined end which is received in said receiving cell such that said inclined end faces said air duct, said body being provided in an outer periphery thereof with two annular grooves, with each having a leakproof ring fitted therein for sealing off inner wall of said receiving cell.

3. The air pump as defined in claim 2, wherein said connection portion is provided in a protruded end thereof with said channel and said guide cell, which face said receiving cell, said channel being put through said connection portion to be in communication with said receiving cell, said guide cell being in communication with said receiving cell via an air hole; wherein said control valve has a pillar urging said inclined end of said movable block via said air hole of said guide cell, said pillar being provided with a leakproof ring fitted thereover.

4. The air pump as defined in claim 1, wherein said inclined slot of said receiving cell is provided with a guide tube facing said opening of said receiving cell; wherein said inclined end of said movable block is provided with a guide hole facing said cylindrical body whereby said guide hole receives said guide tube and said spring urging said movable block and said guide tube.

5. The air pump as defined in claim 1, wherein said press rod is pivoted at one end thereof with an outer end of said opening of said receiving cell of said head member, said press rod further provided with a protrusion for urging said movable block to move toward said air duct.

6. The air pump as defined in claim 1, wherein said inner tube is provided with a receiving recess facing said receiving space; wherein said check valve comprises an end fitting member received in said recess, and a stop member disposed between said recess and said end fitting member.

7. The air pump as defined in claim 6, wherein said recess is provided in a bottom thereof with a semispherical cavity in communication with said channel and said receiving space; wherein said end fitting member is provided with an annular groove for fitting a leakproof ring to seal off inner wall of said recess, said end fitting member provided with a channel and a semispherical cavity contiguous to said semispherical cavity of said recess; wherein said stop member is a round ball and is disposed between said two semispherical cavities.

8. The air pump as defined in claim 1, wherein said inner tube is provided in other end thereof with a rear cover which is provided with an air inlet in communication with said passage; wherein said one-way air valve is disposed over said rear cover.

9. The air pump as defined in claim 8, wherein said rear cover is provided in an outer periphery thereof with an annular grove for fitting a leakproof ring forming said one-way air valve in conjunction with said annular groove.

* * * * *